(No Model.)  
3 Sheets—Sheet 1.

G. A. AMBLER.
ROUNDING OR TRIMMING MACHINE.

No. 560,829.  
Patented May 26, 1896.

WITNESSES:

INVENTOR:  
GEORGE A. AMBLER.  
ATTORNEY (No Model.) 3 Sheets—Sheet 2.
G. A. AMBLER.
ROUNDING OR TRIMMING MACHINE.

No. 560,829. Patented May 26, 1896.

WITNESSES:
B. Mortimer Trusdell.
Wm. L. Canfield, Jr.

INVENTOR:
GEORGE A. AMBLER
BY Fred C. Fraentzel,
ATTORNEY (No Model.) 3 Sheets—Sheet 3.

G. A. AMBLER.
ROUNDING OR TRIMMING MACHINE.

No. 560,829. Patented May 26, 1896.

WITNESSES:
B. Mortimer Twombly
Wm. H. Canfield Jr.

INVENTOR:
GEORGE A. AMBLER,
BY Fred C. Fraentzel,
ATTORNEY

UNITED STATES PATENT OFFICE.

GEORGE A. AMBLER, OF NEWARK, NEW JERSEY.

ROUNDING OR TRIMMING MACHINE.

SPECIFICATION forming part of Letters Patent No. 560,829, dated May 26, 1896.

Application filed March 6, 1896. Serial No. 582,019. (No model.)

*To all whom it may concern:*

Be it known that I, GEORGE A. AMBLER, a citizen of the United States, residing at Newark, in the county of Essex and State of New Jersey, have invented certain new and useful Improvements in Rounding or Trimming Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in rounding or trimming machines for the cutting or trimming of the outer edge of the sole of a shoe during the process of manufacture of the latter; and the invention therefore has for its object to provide a novel arrangement of cutting or trimming-off mechanism for this class of machines in which a knife or tool is operated to have an oscillatory as well as a reciprocatory motion and at the same time having the knife or cutting-tool provided with means which acts upon the material to be cut and feeds the sole in a forward direction after each cut, and thereby bringing the uncut part directly in position beneath the cutting edge of the knife for the next cutting operation.

The invention therefore consists in the novel construction of rounding or trimming machine herein set forth, and also in the novel arrangements and combinations of parts and the details of construction, such as will be fully described in the accompanying specification and finally embodied in the clauses of the claim, reference being had to the accompanying drawings, in which—

Figure 1:
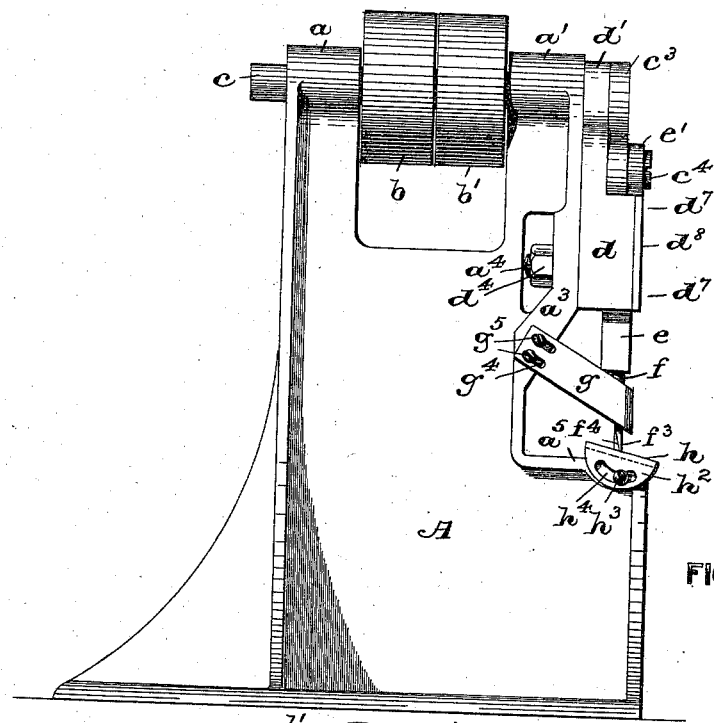
Figure 2:
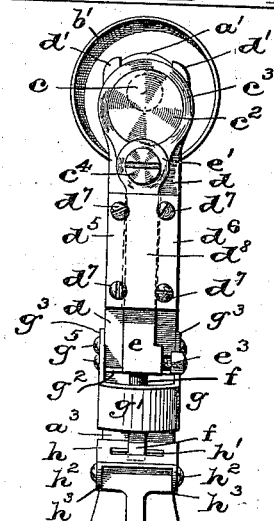
Figure 3:
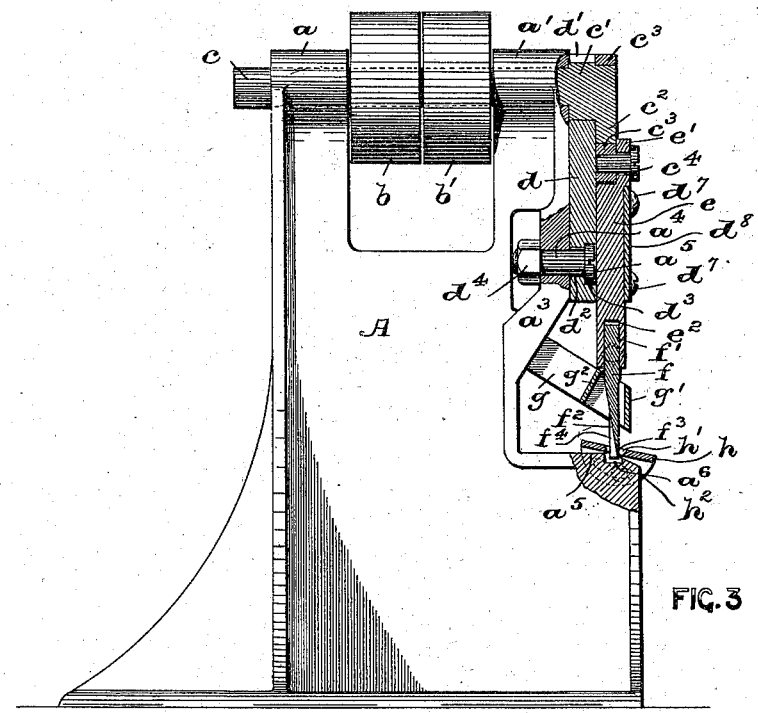
Figure 4:
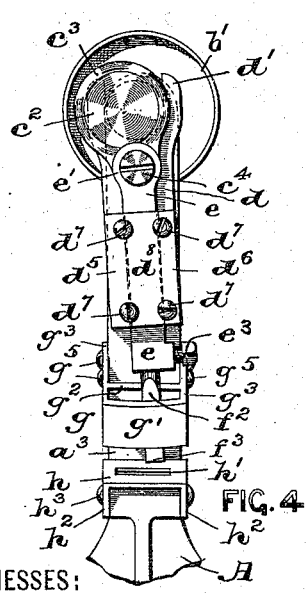
Figure 5:
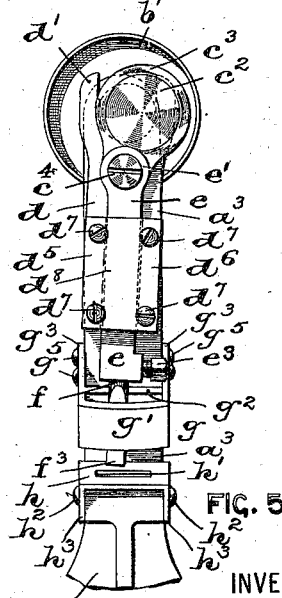
Figure 6:
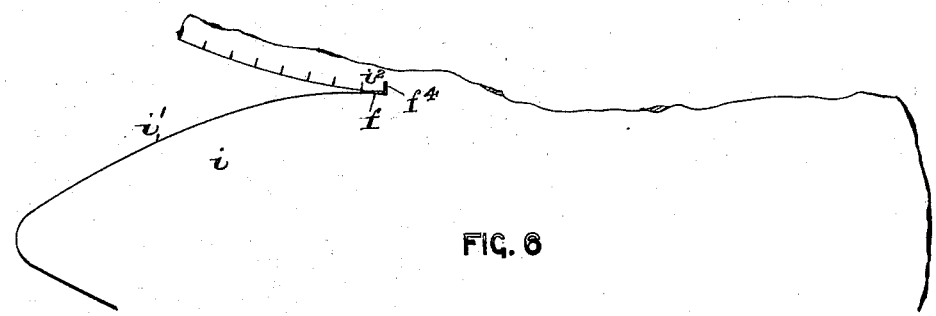
Figures 7, 9:
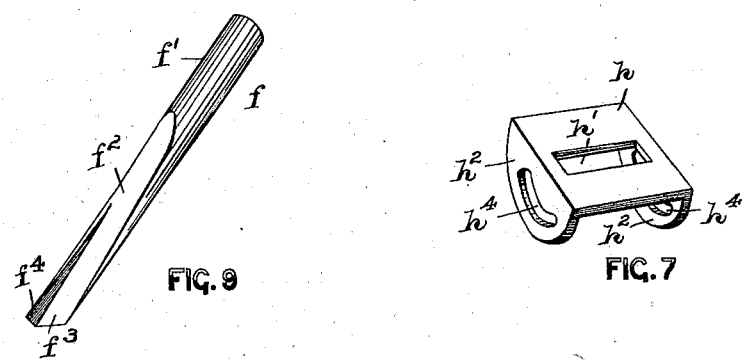
Figures 8, 10:
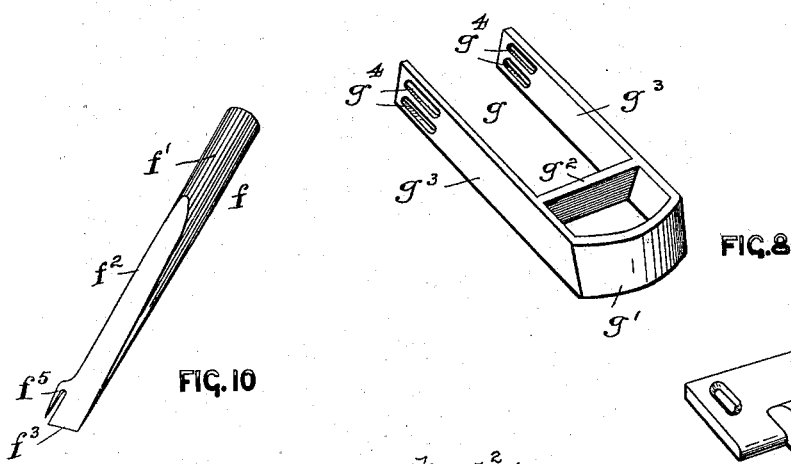
Figure 12:
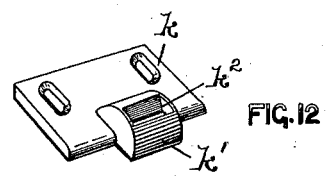
Figure 11:
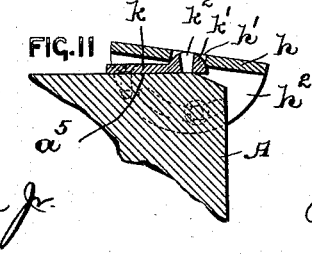

Figure 1 is a side view of my novel form of rounding or trimming machine, and Fig. 2 is a front view of the same. Fig. 3 is a view of the machine similar to that represented in Fig. 1, but illustrating the knife-operating mechanism and certain portions of the machine-frame in vertical section. Figs. 4 and 5 are two front views of the knife-operating mechanism and its knife or cutter, said views illustrating the oscillatory motion of the knife or cutter, and said views also showing an arrangement of guide-plate and an adjustable supporting plate or table adapted to be used in connection with the machine. Fig. 6 is a diagrammatic view of a portion of the sole, showing part of its trimmed edge and part of the uncut portion thereof. Fig. 7 is a perspective view of the adjustable supporting plate or table, and Fig. 8 is a similar view of the guide-plate. Fig. 9 is a perspective view of the combined cutter and feeding means connected therewith; and Fig. 10 is a like view of a cutter of another form of construction, but still embodying the principles of my invention. Fig. 11 is a detail view of a portion of the bed-plate of the machine-frame, a supporting-block secured thereto, and an adjustable supporting-table, all of said parts being represented in vertical section; and Fig. 12 is a perspective view of the supporting-block illustrated in said Fig. 11.

Similar letters of reference are employed in all of the above-described views to indicate like parts.

In said drawings, A indicates the main frame of the machine, which can be secured upon a table or bench, and is provided with suitable bearing portions $a$ and $a'$, in which I have rotatively arranged a driving-shaft $c$, provided with a fast and loose pulley $b$ and $b'$, respectively. Said shaft is formed at or near its one free end with two eccentric portions $c'$ and $c^2$, one of which, as $c^2$, has an eccentric ring $c^3$, substantially as shown in the several figures of the drawings.

The frame A of the machine is provided with a suitable holding portion $a^3$, provided with a perforation for the reception of a suitable pin or screw $a^4$, on which is pivotally arranged an arm or link $d$, provided with a forked end $d'$, into which the eccentric portion $c'$ on the main shaft $c$ is operatively fitted, and causes an oscillatory movement of said arm or link $d$ upon its pin or screw $a^4$, in the manner and for the purposes to be more fully set forth hereinafter. To securely but operatively hold said arm or link $d$ on the said portion $a^3$ of the main frame, I have provided the screw $a^4$ with a head $a^5$, which fits into an enlarged portion $d^3$ of the hole $d^2$ in said arm or link $d$, and acts as a shoulder to prevent the displacement of said arm or link, while the screw-threaded end of said bolt or screw $a^4$, which is screwed into said holding portion $a^3$, extends entirely through the same, being fastened by means of a nut $d^4$, as clearly represented in Figs. 1 and 3; but of course it will be evident that any other suitable means may be employed for pivotally securing said arm or link $d$ to the frame of the machine. On the face of said arm or link $d$ are a pair of outwardly-extending guiding portions $d^5$ and $d^6$, as indicated in dotted outline in Figs. 2, 4, and 5, on which is secured, by means of the screws $d^7$, or in any other well-known manner, a face-plate $d^8$. Pivotally attached to a pin or screw $c^4$ in the eccentric ring $c^3$ is the perforated end $e'$ of a knife or cutter holder $e$, which is preferably rectangular in cross-section, and has a reciprocatory sliding motion between said guiding portions $d^5$ and $d^6$ and the plate $d^8$ on said link or arm $d$ when said eccentric portion $c^2$ and the ring $c^3$ operate said knife-holder. The lower end of said holder $e$ is socketed, as at $e^2$, for the reception of the shank $f'$ of a knife or cutting-tool $f$, which is operatively secured in said socket $e^2$, by means of a suitable set-screw $e^3$ or other holding means, as will be clearly understood. Said knife $f$ is provided with a flattened portion $f^2$, having a sharp cutting edge $f^3$ and a lip or projection $f^4$ extending at a right angle or approximately so from said flattened portion, as clearly illustrated in Fig. 9, or said flattened portion $f^2$ may be provided with a pointed tine $f^5$, substantially as shown in Fig. 10, and the purpose of which will be fully described hereinafter. Said knife or cutter moves between the two bars $g'$ and $g^2$ of a guide-plate $g$, having the arms $g^3$, which embrace the opposite sides of said holding portion $a^3$ of the machine, and are provided with elongated holes $g^4$, whereby said guide-plate can be adjustably secured by means of the screws $g^5$ to said holding portion $a^3$ and projects at an angle therefrom, substantially as illustrated in Figs. 1 and 3.

The frame A of the machine is provided with a suitable bed-plate $a^5$, which is recessed or grooved, as at $a^6$. Above the said bed-plate $a^5$ is adjustably secured a supporting plate or table $h$ for supporting the edge of the sole to be trimmed thereon. Said plate or table $h$ is provided with an opening or slot $h'$, into and through which the cutting portion $f^3$ and the lip $f^4$ or the tine $f^5$ project, and $h^2$ are two downwardly-extending leaves or projections which are adapted to fit down against the opposite sides of the bed-plate $a^5$ of the machine, being adjustably secured thereto by screws $h^3$, arranged in the segmental slots $h^4$ in said downwardly-extending leaves or projections $a^2$, as will be clearly evident.

The operation of the machine is as follows: After having adjusted said plate or table $h$ to cause the cutting edge of the knife or tool $f$ to trim the edge $i'$ of the sole $i$ (see Fig. 6) to the desired angle, then the driving-shaft $c$ is started. The result will be that the eccentric $c^2$ and its ring $c^3$ will force the knife-holder $e$, and hence the knife, from its raised position to its lowered position and down into the edge of the sole $i$, thus making a right-angled cut, as at $i^2$ in Fig. 6. At the same time the eccentric portion $c'$ on the shaft $c$ will move in frictional sliding contact between the fingers of the forked end $d'$ of the arm or link $d$, which thereby receives a pivotal motion on the pin or screw $a^4$, as has been hereinabove stated. The guide portions $d^5$ and $d^6$ and said plate $d^8$ on said link or arm $d$ will at the same time cause a side movement of the lower portion of the cutting knife or tool $f$ from the position indicated in Fig. 4 to that represented in Fig. 5, and the lip or projection $f^4$, owing to its construction, pushes the sole along until the knife edge has reached the limit of its travel, when the knife is withdrawn from the cut material and moves upwardly, the mechanism causing the knife to oscillate and come down again in the position indicated in Fig. 4 to produce a new cut in the edge of the sole and again feed the latter forward in the manner stated. In this manner by the arrangement of the hereinabove-described mechanism the knife receives a very rapid reciprocatory as well as an oscillatory motion, and thus cuts and feeds the sole properly beneath the cutting edge of the knife, and thereby perfectly trims or rounds the edge of the sole.

In Fig. 10 I have illustrated the use of a tine $f^5$ in connection with the blade of the cutter, which will be forced into the material to be cut directly in front of the cut, and hence will cause the sole to be carried forward during the cutting operation of the knife, as will be clearly understood.

In Figs. 11 and 12 I have shown an arrangement of a supporting-block $k$, which is to be secured on the bed-plate $a^5$ of the machine-frame A in any well-known manner. Said block is provided with a rounded projection $k'$, in which there is a long hole or projection $k^2$ for the reception of the cutting edge of the knife $f$ while the machine is being operated. Said block is for the purpose of supporting the plate or table $h$, in which the opening $h'$ is correspondingly arranged over the opening $k^2$ in the block $k$, so as not to interfere with the working of the knife $f$. Owing to the arrangement of said rounded projection $k'$ the said table $h$ can be made to rest thereon, which reduces the strain upon the leaves $h^2$ of said table and upon the screws for securing the same to the machine-frame, and also acts as a suitable guide to more readily enable the adjustment of the table $h$, when necessary.

By my present invention I have devised a simple and operative machine for rounding or trimming the edge of the sole of a shoe in which the sole is automatically fed beneath the cutting edge of the knife during the cutting operation of the latter by the action and construction of the knife itself and the arrangement of its operating mechanism.

Of course it will be understood that many changes may be made in the details of construction and the general arrangements of the several parts of the mechanism herein set forth without departing from the scope of my invention. Hence I do not limit my invention to the exact arrangements and combinations of the parts herein shown and described.

Having thus described my invention, what I claim is—

1. In a rounding or trimming machine, the combination, with the frame of the machine, and the knife or tool holder thereof, a cutting knife or tool, having a cutting edge and means formed integral with said knife for feeding the material during the cutting operation, of mechanism connected therewith for producing a reciprocatory and at the same time an oscillatory movement of said knife-holder and knife, substantially as and for the purposes set forth.

2. In a rounding or trimming machine, the combination, with the frame of the machine, of a forked arm pivotally attached to said frame, a guide on said arm, a knife or tool holder arranged in said guide, a cutting knife or tool, having a cutting edge and means formed integral with said knife for feeding the material during the cutting operation, means connected with said forked arm for producing an oscillatory movement of the same, and means connected with said knife-holder for producing a reciprocatory movement of the latter and its knife, substantially as and for the purposes set forth.

3. In a rounding or trimming machine, the combination, with the frame of the machine, of a forked arm $d$ pivotally attached to said frame, a guide on said arm, a knife or tool holder arranged in said guide, having a cutting knife or tool, a main shaft in bearings in the frame of the machine, an eccentric $c'$ on said shaft adapted to engage with the forked end of said arm $d$, to produce an oscillatory movement of the same, and an eccentric $c^2$ and ring $c^3$ on said shaft connected with said knife or tool holder to produce a reciprocatory movement of the same, substantially as and for the purposes set forth.

4. In a rounding or trimming machine, the combination, with the frame of the machine, and the knife or tool holder thereof, of mechanism connected therewith for producing a reciprocatory and at the same time an oscillatory movement of the same, a knife $f$, having a cutting edge $f^3$, and means thereon for producing a feeding motion of the material during the cutting operation, substantially as and for the purposes set forth.

5. In a rounding or trimming machine, the combination, with the frame of the machine, a forked arm pivotally attached to said frame, a guide on said arm, a knife or tool holder arranged in said guide, means connected with said forked arm for producing an oscillatory movement of the same, means connected with said knife or tool holder for producing a reciprocatory movement of the latter, a knife or tool on said knife or tool holder, and means on said knife or tool for producing a feeding motion of the material during the cutting operation, substantially as and for the purposes set forth.

6. In a rounding or trimming machine, the combination, with the frame of the machine, of a forked arm $d$ pivotally attached to said frame, a guide on said arm, a knife or tool holder arranged in said guide, a main shaft in bearings in the frame of the machine, an eccentric $c'$ on said shaft adapted to engage with the forked end of said arm $d$, to produce an oscillatory movement of the same, an eccentric $c^2$ and ring $c^3$ on said shaft connected with said knife or tool holder to produce a reciprocatory movement of the latter, a knife or tool on said knife or tool holder, and means on said knife or tool for producing a feeding motion of the material during the cutting operation, substantially as and for the purposes set forth.

7. In a rounding or trimming machine, the combination, with the frame of the machine, and the knife or tool holder thereof, having a cutting knife or tool, of mechanism connected therewith, for producing a reciprocatory and at the same time an oscillatory movement of said knife-holder and knife, and an adjustable supporting plate or table on said machine-frame, substantially as and for the purposes set forth.

8. In a rounding or trimming machine, the combination, with the frame of the machine, and the knife or tool holder thereof, having a cutting knife or tool, of mechanism connected therewith, for producing a reciprocatory and at the same time an oscillatory movement of said knife-holder and knife, and an adjustable supporting plate or table on said machine-frame, comprising therein, a plate $h$, having an opening $h'$, leaves $h^2$ having segmental slots $h^4$ and screws $h^3$ for securing said plate $h$ to said machine-frame, substantially as and for the purposes set forth.

9. In a rounding or trimming machine, the combination, with the frame of the machine, and the knife or tool holder thereof, having a cutting knife or tool, of mechanism connected therewith, for producing a reciprocatory and at the same time an oscillatory movement of said knife-holder and knife, and a guide-plate $g$, comprising therein, bars $g'$ and $g^2$, arms $g^3$ having elongated holes, and screws in said holes for securing said guide-plate $g$ to the machine-frame, substantially as and for the purposes set forth.

10. The herein-described knife $f$, for a rounding or trimming machine, comprising therein, a body having a cutting edge $f^3$, and means thereon, for feeding the material during the cutting operation, substantially as and for the purposes set forth.

11. The herein-described knife $f$, for a rounding or trimming machine, comprising therein, a body having a cutting edge $f^3$, and a tine $f^5$ adapted to be forced into the material for feeding the same, during the cutting operation, substantially as and for the purposes set forth.

In testimony that I claim the invention set forth above I have hereunto set my hand this 4th day of March, 1896.

GEORGE A. AMBLER.

Witnesses:
FREDK. C. FRAENTZEL,
WM. H. CAMFIELD, Jr.